(12) United States Patent
Jang et al.

(10) Patent No.: US 7,116,876 B2
(45) Date of Patent: Oct. 3, 2006

(54) OPTICAL FIBER FOR METRO NETWORK

(75) Inventors: Yun-Geun Jang, Gumi-si (KR); Sung-Koog Oh, Gumi-si (KR); Ju-Chang Han, Gumi-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 108 days.

(21) Appl. No.: 10/918,570

(22) Filed: Aug. 13, 2004

(65) Prior Publication Data

US 2005/0175303 A1 Aug. 11, 2005

(30) Foreign Application Priority Data

Feb. 7, 2004 (KR) .................... 10-2004-0008131

(51) Int. Cl.
*G02B 6/02* (2006.01)
*H04J 14/02* (2006.01)

(52) U.S. Cl. .................... 385/123; 386/126; 386/141; 398/81

(58) Field of Classification Search ............... 385/123, 385/124, 126, 127, 141, 125, 81; 398/81
See application file for complete search history.

(56) References Cited

U.S. PATENT DOCUMENTS

| | | | | |
|---|---|---|---|---|
| 6,445,864 B1* | 9/2002 | Jiang et al. | ................. | 385/127 |
| 6,490,398 B1* | 12/2002 | Gruner-Nielsen et al. | .. | 385/123 |
| 6,498,887 B1* | 12/2002 | Gruner-Nielsen et al. | .. | 385/123 |
| 6,587,627 B1* | 7/2003 | Saitou et al. | ................ | 385/127 |

\* cited by examiner

*Primary Examiner*—Brian M. Healy
(74) *Attorney, Agent, or Firm*—Cha & Reiter, L.L.C.

(57) ABSTRACT

An optical fiber for an optical network is disclosed. The optical fiber includes a core having a core region having a first refractive index $N_1$, and a refractive index depressed region surrounding the core region and having a second refractive index $N_2$ that is lower than the first refractive index. A clad surrounds the core and having a third refractive index $N_4$. The optical fiber has a zero-dispersion wavelength that is not less than 1555 nm and positioned in a wavelength range which does not exceed L-band. The optical fiber has negative dispersion values in C-band and positive dispersion values in L-band.

18 Claims, 6 Drawing Sheets

OPTICAL FIBER FOR METRO NETWORK

CLAIM OF PRIORITY

This application claims priority to an application entitled "Optical Fiber for Metro Network," filed with the Korean Intellectual Property Office on Feb. 7, 2004 and assigned Serial No. 2004-8131, the contents of which are hereby incorporated by reference.

BACKGROUND OF THE INVENTION

1. Field of the Invention

The present invention relates to an optical network, in particular to an optical fiber for use as a transmission line in such an optical metro-area network.

2. Description of the Related Art

In general, optical fibers, used in metro networks, have a negative dispersion characteristic. The fibers include core with a high refractive index and a clad surrounding the core. An annular region having a refractive index lower than that of the core may be interposed between the core and the clad.

U.S. Pat. No. 4,715,679 to Bhagavatula, which is entitled "Low Dispersion, Low-Loss Single-Mode Optical Waveguide," discloses a single mode optical waveguide consisting of a core having an annular refractive index depressed region and a clad enclosing the core.

When configuring a metro network, it is more economical, in a lower transmission rate, to configure the metro network in a direct modulation (DM) mode than in an external modulation (EM) mode.

FIG. 1a is a schematic diagram illustrating a direct modulation mode and FIG. 1b is a schematic diagram illustrating an external modulation mode.

Referring to FIG. 1a, light output from a laser diode (LD) 110 is modulated by applying a direct current (DC) voltage $I_{DC}$ and data to the laser diode (LD) 10. It is known that a directly modulated optical signal exhibits a positive chirp characteristic.

Referring to FIG. 1b, light is produced by applying DC voltage $I_{DC}$ to a laser diode 210, and a modulator 220 receives and modulates the light to the input data.

A conventional metro network or access network is configured using standard single mode fibers (SSMFs). In consideration of the fact that a directly modulated optical signal exhibits a positive chirp characteristic, a conventional method for configuring a metro network using non-zero dispersion shifted fibers (NZDSFs) having negative dispersion values (about −7 to −8 ps/nm/km at 1550 nm) is also known. However, such a method needs many restrictive requirements in order to achieve an effect on transmission characteristics. Furthermore, it is noted that when an optical communication network uses a 10 Gbps transmission rate and a 1550 nm band direct modulation mode, the SSMFs can be applied to a transmission distance of about 10 km and NZDSFs having negative dispersion values can be applied to a transmission distance of about 75 km. The SSMFs have difficulty providing good transmission characteristics due to the chirp phenomenon caused by the direct modulation, and the NZDSFs are not effective in a network longer than 100 km due to the excessively high negative dispersion values thereof. When a metro network is configured using SMFs, configuring such a network become more complex because one or more separate dispersion control optical fibers must be used.

FIG. 2 is a graph showing Q-factor curves with respect to individual transmission distances for a typical SMF and negative dispersion fibers (NDFs). FIG. 2 shows Q-factor curves of an optical signal with preamp and with 5 dB extinction ratio proceeds through a first NDF, in which an optical signal with preamp and with 8 dB extinction ratio proceeds through a second NDF, in which an optical signal without preamp and with 8 dB extinction ratio proceeds through a third NDF, and in which an optical signal without preamp and with 8 dB extinction ratio proceeds through an SMF, respectively. It can be seen that the typical SMF has difficulty providing good transmission characteristics due to the chirp phenomenon caused by the direct modulation, and the typical NDFs have a restriction in transmission distance in a metro network due to the high negative dispersion values thereof.

FIG. 3 is a graph illustrating characteristics of an erbium doped fiber amplifier. FIG. 3 shows gain curves in the individual cases in which a −40 dBm optical signal is input, in which a −10 dBm optical signal is input, and in which a +5 dBm optical signal is input; and a noise figure curve for a −10 dBm optical signal. The channel efficiency decreases in a wavelength band in the range of 1560 to 1570 nm, which is the dead zone of the erbium doped fiber amplifier.

It is also noted that because a typical NZDSF has dispersion values suitable for C-band (1530 to 1565 nm), it has a restriction in using L-band and contributes to deteriorate the channel efficiency of a metro network in combination with the dead zone of the erbium doped fiber amplifier.

FIG. 4 is a graph showing a refractive index profile of a typical NZDSF having negative dispersion values. The NZDSF includes a double-ring shaped core located at the center of the NZDSF, a refractive index depressed region, and a clad. The NZDSF has a poor coupling efficiency with an existing optical fiber due to its complicated refractive index profile. In addition, the NZDSF has a problem in that macro bending loss is very high due to its large refractive index depressed region.

Accordingly, there is a need in the art for an optical fiber having optical characteristics suitable for a 2.5 Gbps transmission rate, which is a principle transmission rate of metro networks at present, and a 10 Gbps transmission rate which will be widely used in the future.

SUMMARY OF THE INVENTION

One aspect of the present invention relates to an optical fiber with increased channel efficiency. For example, it may be economically configured and highly compatible for existing metro networks.

One embodiment of the present invention is directed to an optical fiber for a metro network including a core having a core region having a highest refractive index $N_1$ and a refractive index depressed region having a lowest refractive index $N_2$; and a clad surrounding the core and having a pre-established refractive index $N_4$. The optical fiber has a zero-dispersion wavelength, which is not less than 1555 nm and positioned in a wavelength range which does not exceed L-band, and the optical fiber has negative dispersion values in C-band and positive dispersion values in L-band.

BRIEF DESCRIPTION OF THE DRAWINGS

The above features and embodiments of the present invention will be more apparent from the following detailed description taken in conjunction with the accompanying drawings, in which:

FIG. 5b is a graph showing a refractive index profile of the optical fiber shown in FIG. 5a;

FIG. 7 is a graph illustrating dispersion characteristics with respect to individual drawing temperatures of the optical fiber shown in FIG. 5a.

DETAILED DESCRIPTION

Hereinafter, embodiments of the present invention will be described with reference to the accompanying drawing. For the purposes of clarity and simplicity a detailed description of known functions and configurations incorporated herein will be omitted when it may obscure the subject matter of the present invention.

Figure 1A:
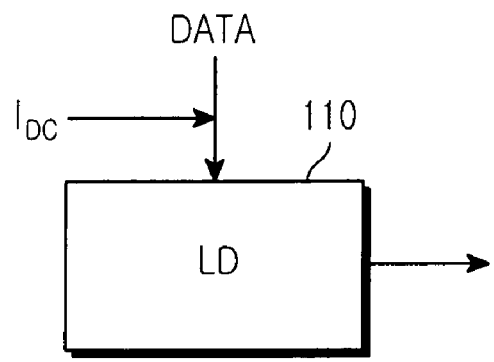
FIG. 1a is a schematic diagram illustrating a direct modulation mode.
Figure 1B:
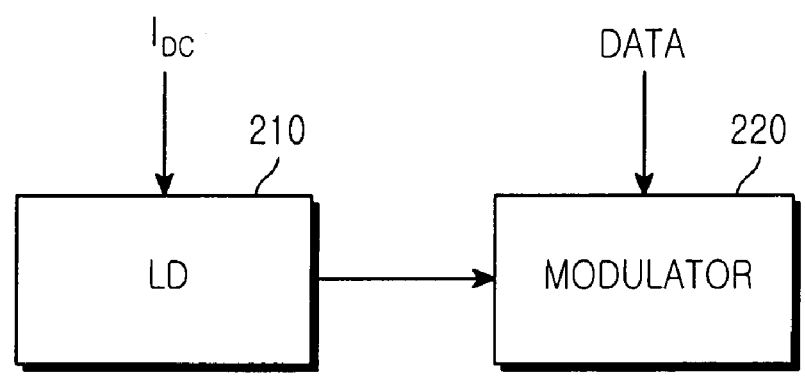
FIG. 1b is a schematic diagram illustrating an external modulation mode.
Figure 2:
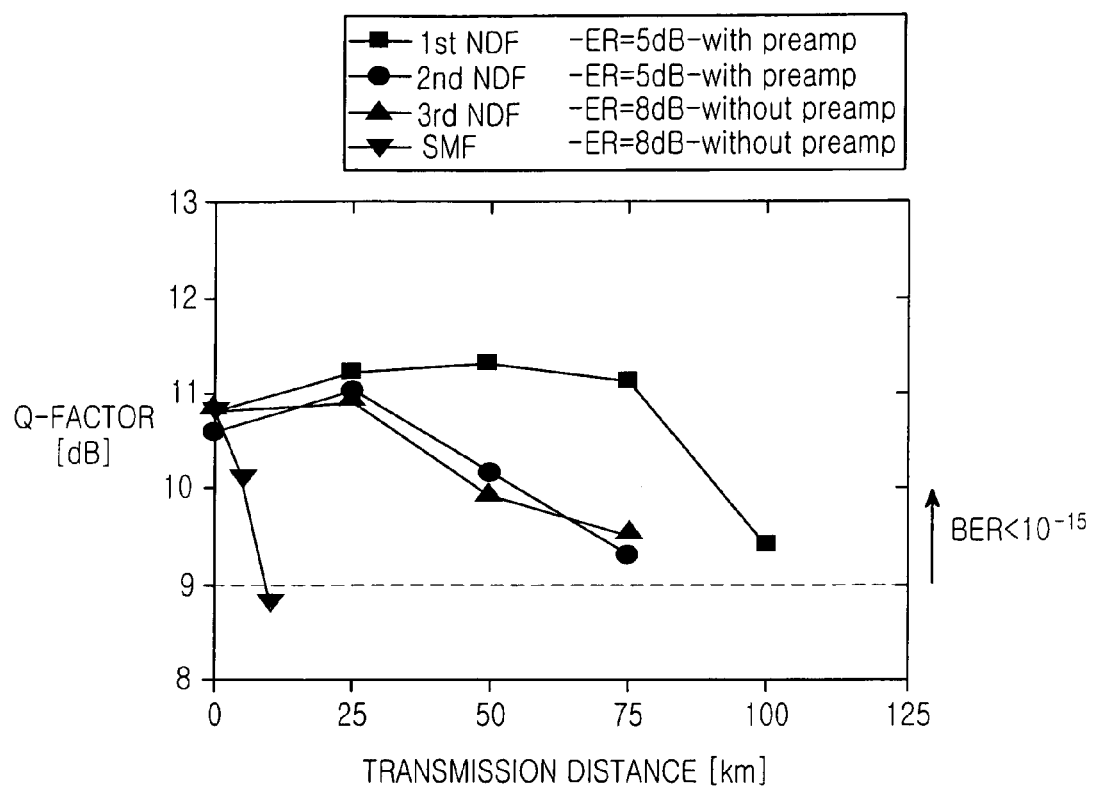
FIG. 2 is a graph showing Q-factor curves with respect to individual transmission distances for a typical SMF and NDFs.
Figure 3:
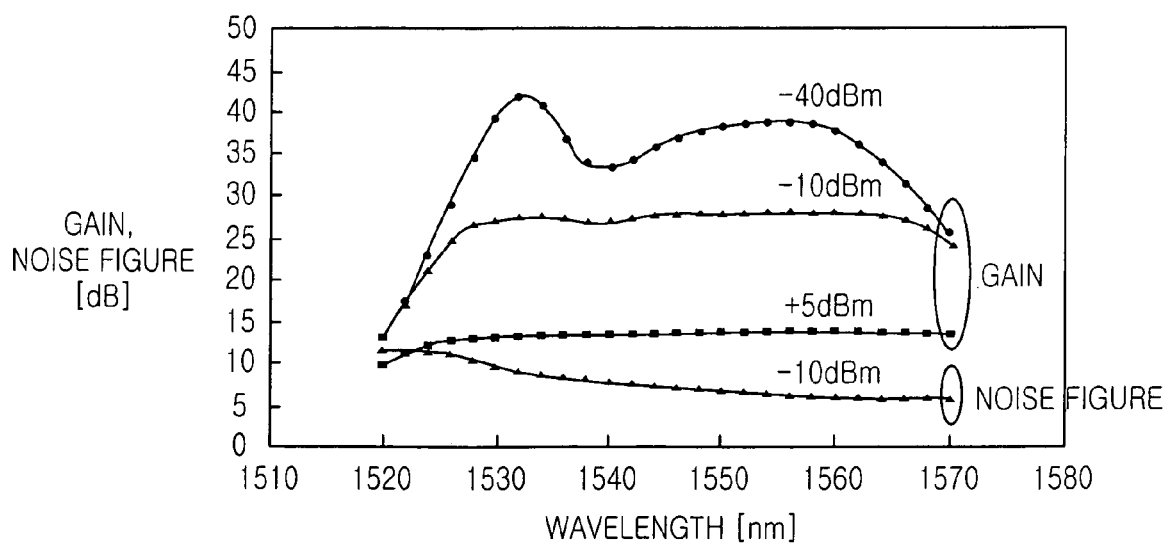
FIGS. 3 is a graph illustrating characteristics of a typical erbium doped fiber amplifier.
Figure 4:
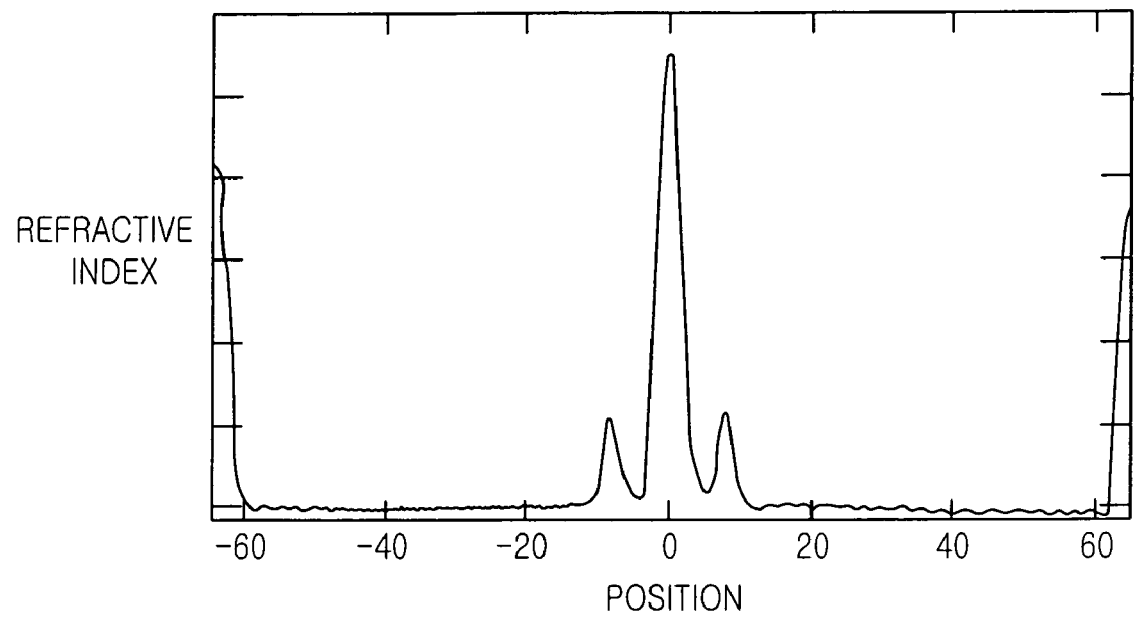
FIG. 4 is a graph showing a refractive index profile of a typical NZDSF having negative dispersion values.
Figure 5A:
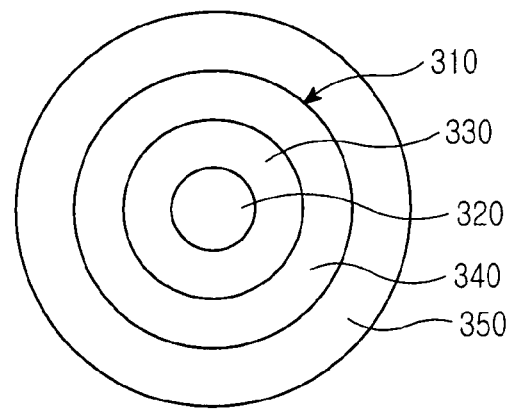
FIG. 5a is a schematic cross-sectional view showing the construction of an optical fiber for a metro network according to one embodiment of the present invention.
Figure 5B:
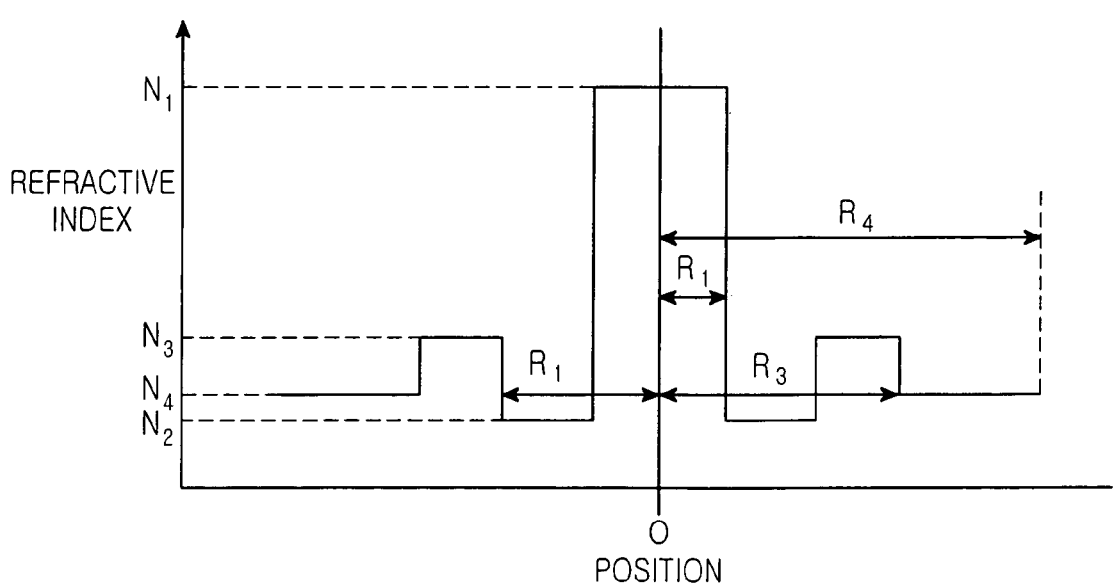

FIG. 5a shows the construction of an optical fiber for a metro network according to one embodiment of the present invention. FIG. 5b shows a refractive index profile of the optical fiber shown in FIG. 5a. The optical fiber 300 includes a core 310 having of a core region 320, a refractive index depressed region 330, and an annular region 340, and a clad 350.

The core region 320 has a radius $R_1$ from the center of the optical fiber 300 and a refractive index $N_1$. Here, $N_1$ is the highest refractive index of the optical fiber 300 as compared to the refractive index depressed region 330, and the annular region 340 and the clad 350.

The refractive index depressed region 300 surrounds the core region 320. The inner circumference of the refractive index depressed region 300 conforms to the outer circumference of the core region 320 and the outer circumference of the refractive index depressed region 300 has a radius $R_2$ from the center of the optical fiber 300 and a refractive index $N_2$. $N_2$ is the lowest refractive index of the optical fiber 300.

The annular region 340 surrounds the refractive index depressed region 300. The inner circumference of the annular region 340 conforms to the outer circumference of the refractive index depressed region 300 and the outer circumference of the annular region 340 has a radius $R_3$ from the center of the optical fiber 300 and a refractive index $N_3$. $N_3$ is higher than $N_2$ but lower than $N_1$.

The clad 350 surrounds the annular region 340. The inner circumference of the clad 350 conforms to the outer circumference of the annular region 340 and the outer circumference of the clad 350 has a radius $R_4$ from the center of the optical fiber 300 and a refractive index $N_4$. $N_4$ is higher than $N_2$ but lower than $N_3$.

In this embodiment, the refractive indexes of the optical fiber 300 have a relationship of $0.34\% \leq (N_1-N_4)/N_4 \leq 0.55\%$ and $-0.005\% \geq (N_2-N_4)/N_4 \geq 310.01\%$.

The optical fiber 300 has residual stress symmetrically distributed in the radial direction with reference to the center of the optical fiber, the absolute value of which stress is not more than 80 MPa.

Figure 6:
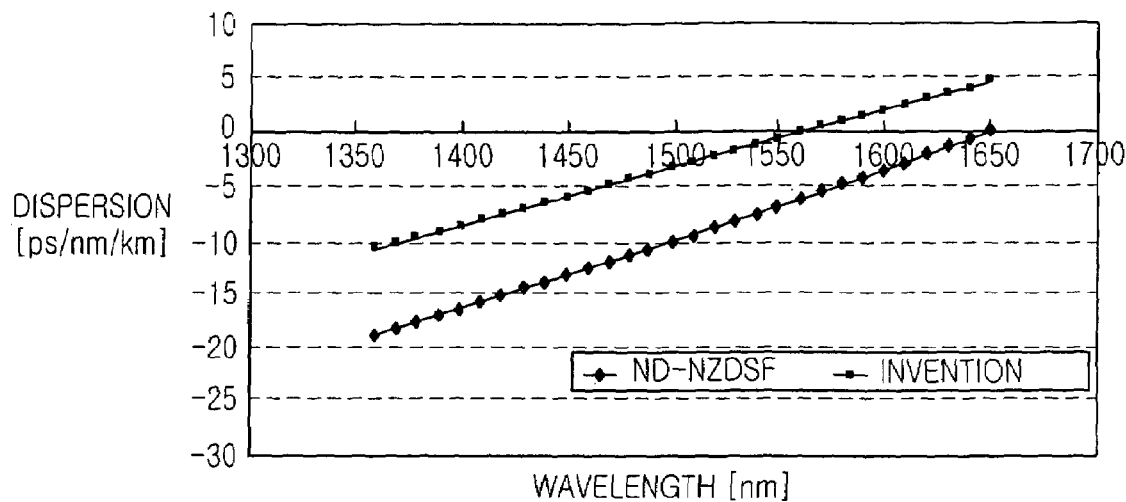
FIG. 6 is a graph showing a comparison between the characteristics of the optical fiber shown in FIG. 5a and a typical NZDSF having negative dispersion values.

FIG. 6 is a graph showing a comparison between the characteristics of the optical fiber shown in FIG. 5a and a typical NZDSF (ND-NZDSF) having negative dispersion values. FIG. 6 shows a dispersion curve of the optical fiber 300 shown in FIG. 5a with respect to wavelengths (hereinbelow, referred to as "first dispersion curve"), and a dispersion curve of a typical NZDSF having negative dispersion values with respect to wavelengths (hereinbelow, referred to as "second dispersion curve").

The first dispersion curve exhibits negative dispersion values in C-band and positive dispersion values in L-band. This is aimed to obtain the maximum channel efficiency by matching the dead zone present in the existing erbium doped fiber amplifier and the zero-dispersion position of the optical fiber with each other. The zero-dispersion wavelength of the first dispersion curve is not less than 1555 nm and positioned in a wavelength range which does not exceed L-band, preferably in the range of 1565 to 1575 nm. It is possible to economically configure a metro network by applying a direct modulation mode in C-band where the first dispersion curve has negative dispersion values while applying an external modulation mode in L-band where the first dispersion curve has positive dispersion values. If the direct modulation mode is employed in C-band, it is possible to obtain the maximum transmission efficiency at the 2.5 Gbps and 10 Gbps transmission rates. In addition, by employing the external modulation mode in L-band, it is possible to enhance the frequency efficiency of an entire metro network.

The optical fiber 300 has a dispersion slope not more than 0.08 $ps/nm^2/km$ in the 1550 nm band. This ensures that the optical fiber 300 has suitable dispersion values in C-band and L-band. The optical fiber 300 can also exhibit the optimum channel efficiency when the dispersion slope is not more than 0.07 $ps/nm^2/km$. Because the optical fiber 300 has a simple refractive index profile and the refractive depressed region 330 is not large, the optical fiber 300 allows an effective cross-sectional area for a certain wavelength band to be increased, and for example, in C-band, the optical cable 300 can have an effective cross-sectional area not less than 30 $\mu m^2$. In addition, in L-band, if the effective cross-sectional area is not less than 55 $\mu m^2$, it is possible to obtain an effect of smooth transmission at 10 Gbps. Furthermore, due to such a large effective cross-sectional area, the optical fiber 300 allows for easy coupling with an existing optical fiber provided in a metro network.

In addition, because such an optical fiber 300 has a simple refractive index profile, it is easy to fabricate and connect such an optical fiber 300 to an existing optical fiber. The optical fiber 300 allows for configuration of a network in a CWDM (Coarse Wavelength Division Multiplexing) mode, and may have so large an effective cross-sectional area that a DWDM (Dense Wavelength Division Multiplexing) mode can be employed. This can enhance the channel efficiency when used with many subscribers. In addition, because the optical fiber 300 has a suitable dispersion slope, it is possible to employ a CWDM mode even from O-band.

In order to minimize optical loss, it is possible to reduce the refractive index depressed region in the optical fiber 300. The refractive index depressed region may be formed, for example, from $SiO_2$, $GeO_2$ or $P_3O_5$. In order to employ the optical fiber 300 in C-band and L-band, the optical loss of the optical fiber 300 must exhibit a loss characteristic of not more than 0.28 dB/km over the entire area thereof. It is preferable that the optical fiber 300 exhibits a loss characteristic of not more than 0.26 dB/km in particular in L-band.

In combination with the positive chirp caused by the direct modulation mode, the negative dispersion values of the optical fiber 300 in C-band will assure the transmission distance over which transmission can be executed without any dispersion compensation.

Figure 7:
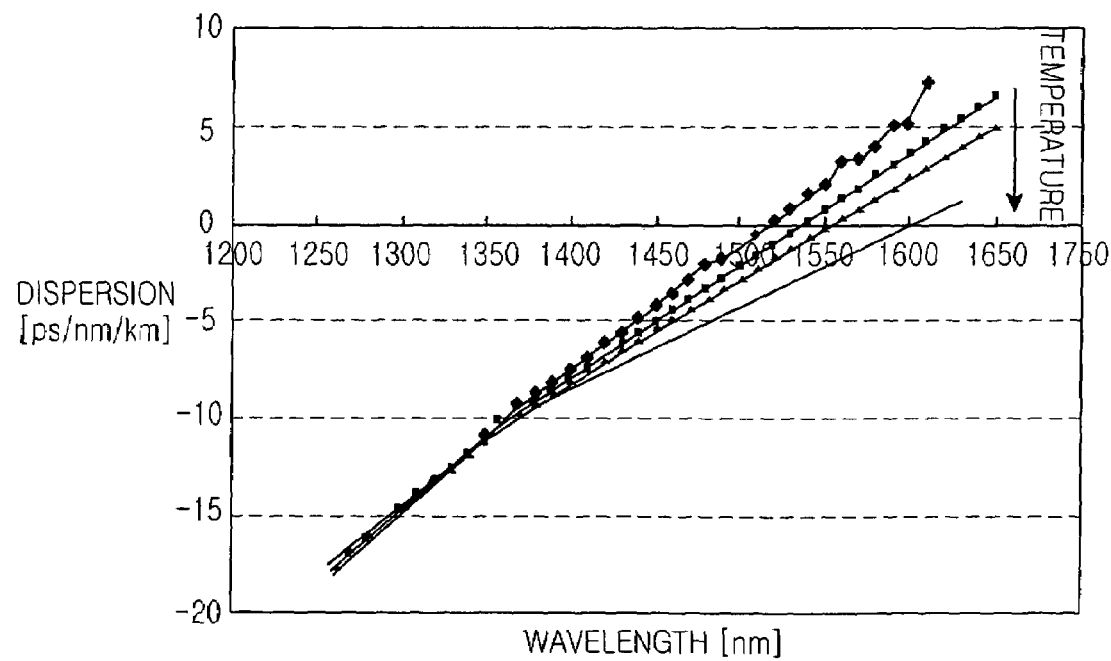

FIG. 7 is a graph illustrating dispersion characteristics with respect to individual drawing temperatures of the optical fiber shown in FIG. 5a. From the drawing, it can be seen that the first to fourth wavelength dispersion curves are almost in conformity with each other in the short wavelength area but the differences between the dispersion curves increase as they go on more and more toward the long wavelength area. The dispersion slopes exhibit a tendency of decreasing as the drawing temperatures increase. The optimum dispersion characteristics suitable for C-band and L-band will be controlled by adjusting the refractive indexes and radii of individual constitutional regions, and the detailed dispersion characteristics will be controlled using the drawing temperatures by taking a blocking wavelength into consideration.

Figure 8:
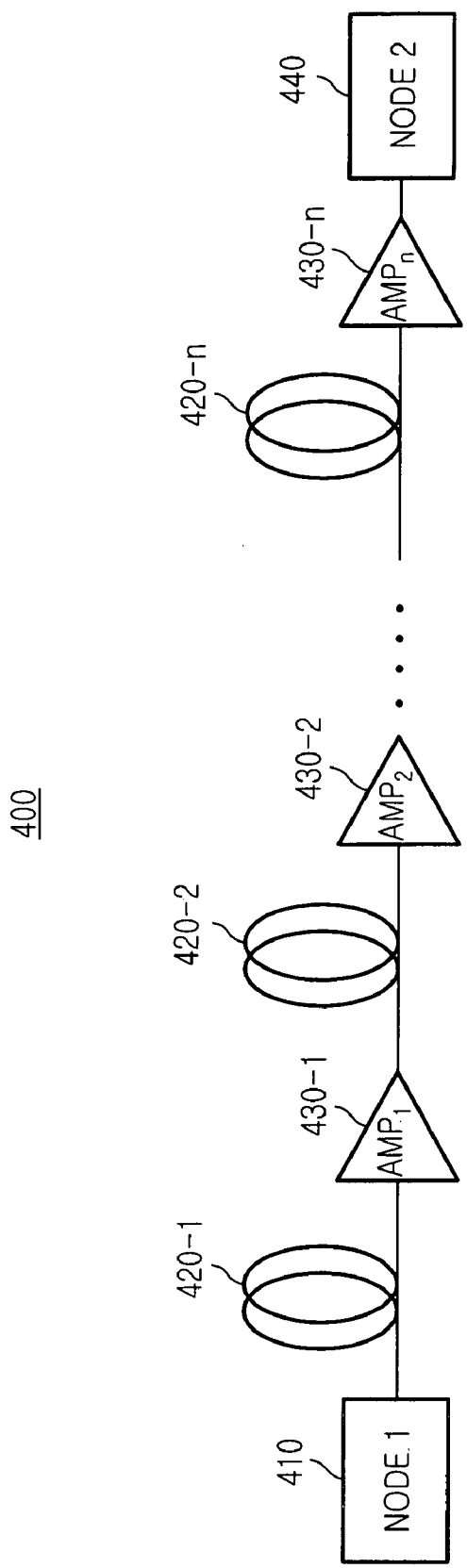
FIG. 8 is a schematic diagram showing a part of a metro network configured using the inventive optical fiber.

FIG. 8 is a schematic diagram showing a part of a metro network configured using an optical fiber in accordance with the embodiments discussed above. First to nth optical fibers 430-1 to 430-n and first to nth erbium doped fiber amplifiers, which are alternately connected with one another, are located between first and second nodes of the metro network. The metro network 400 can be economically configured because it does not need a dispersion control optical fiber.

As described above, in the above metro network example, one advantage in that the maximum channel efficiency can be obtained by matching the dead zone present in an existing erbium doped fiber amplifier and the zero-dispersion position of the optical fiber. The maximum transmission efficiency can be obtained at the 2.5 Gbps and 10 Gbps transmission rates when a direct modulation mode is employed in C-band.

metro network also has an advantage in that such a metro network can be economically configured by applying a direct modulation mode in C-band where the optical fiber has negative dispersion values, while applying an external modulation mode in L-band where the optical fiber has positive dispersion values.

While the invention has been shown and described with reference to certain embodiments thereof, it will be understood by those skilled in the art that various changes in form and details may be made therein without departing from the spirit and scope of the invention as defined by the appended claims.

What is claimed is:

1. An optical fiber comprising:
a core having a core region having a first refractive index, and a refractive index depressed region surrounding the core region and having a second refractive index that is lower than the first refractive index; and
a clad surrounding the core and having a third refractive index, wherein the optical fiber has a zero-dispersion wavelength that is not less than 1555 nm and positioned in a wavelength range that does not exceed L-band, and the optical fiber has only negative dispersion values in a wavelength range of from 1530 nm to the zero-dispersion wavelength and only positive dispersion values in a wavelength range of from the zero-dispersion wavelength to 1625 nm.

2. The optical fiber as claimed in claim 1, wherein the zero-dispersion wavelength is positioned in a wavelength range of 1565 to 1575 nm.

3. The optical fiber as claimed in claim 1, wherein the optical fiber has a dispersion slope not more than 0.08 ps/nm$^2$/km in the 1550 nm band.

4. The optical fiber as claimed in claim 1, wherein the optical fiber has an effective cross-sectional area not less than 55 μm$^2$.

5. The optical fiber as claimed in claim 1, wherein the refractive indexes have a relationship of $0.34\% \leq (N_1-N_4)/N_4 \leq 0.55\%$ and $-0.005\% \geq (N_2-N_4)/N_4 \geq -0.01\%$, where the first refractive index is $N_1$, the second refractive index is $N_2$, and the third refractive index is $N_4$.

6. The optical fiber as claimed in claim 1, wherein the optical fiber has a dispersion slope not more than 0.07 ps/nm$^2$/km in the 1550 nm band.

7. The optical fiber as claimed in claim 1, wherein the optical fiber has residual stress symmetrically distributed in the radial direction with reference to the center of the optical fiber, the absolute value of which stress is not more than 80 MPa.

8. The optical fiber as claimed in claim 1, wherein the refractive index depressed region is formed from $SiO_2$, $GeO_2$ or $P_2O_5$.

9. A metro network comprising: at least two nodes; at least one optical fiber connecting the nodes; and a plurality of erbium doped fiber amplifiers connected between the at least two nodes, wherein the at least one optical fiber includes a core having a core region having a first refractive index, and a refractive index depressed region surrounding the core region and having a second refractive index that is lower than the first refractive index, and a clad surrounding the core and having a third refractive index, wherein the optical fiber has a zero-dispersion wavelength that is not less than 1555 nm and positioned in a wavelength range that does not exceed L-band, and the optical fiber has negative dispersion values in C-band and positive dispersion values in L-band.

10. The metro network as claimed in claim 9, wherein the zero-dispersion wavelength is positioned in a wavelength range of 1565 to 1575 nm.

11. The metro network as claimed in claim 9, wherein the optical fiber has a dispersion slope not more than 0.08 ps/nm$^2$/km in the 1550 nm band.

12. The metro network as claimed in claim 9, wherein the optical fiber has an effective cross-sectional area not less than 55 μm$^2$.

13. The metro network as claimed in claim 9, wherein the refractive indexes have a relationship of $0.34\% \leq (N_1-N_4)/N_4 \leq 0.55\%$ and $-0.005\% \geq (N_2-N_4)/N_4 \geq -0.01\%$, where the first refractive index is $N_1$, the second refractive index is $N_2$, and the third refractive index is $N_4$.

14. The metro network as claimed in claim 9, wherein the optical fiber has a dispersion slope not more than 0.07 ps/nm$^2$/km in the 1550 nm band.

15. The metro network as claimed in claim 9, wherein the optical fiber has residual stress symmetrically distributed in the radial direction with reference to the center of the optical fiber, the absolute value of which stress is not more than 80 MPa.

16. The metro network as claimed in claim 9, wherein the refractive index depressed region is formed from $SiO_2$, $GeO_2$ or $P_2O_5$.

17. A method for configuring a metro optical network including at least one optical fiber, the method comprising the steps of: applying a direct modulation mode in a C-band where the optical fiber has negative dispersion values; and applying an external modulation mode in L-band where the optical fiber has positive dispersion values.

18. The method according to claim 17, wherein the metro optical network also includes at least one erbium doped fiber amplifier, and the method further comprises the step of:

matching a dead zone of the erbium doped fiber amplifier and a zero-dispersion position of the optical fiber.

* * * * *